United States Patent [19]

Morrison et al.

[11] 3,960,589

[45] June 1, 1976

[54] STABILIZED PIGMENT AND METHOD FOR PRODUCING THE SAME

[75] Inventors: Stanley Roy Morrison, Los Altos, Calif.; Thomas Freund, Rochester, N.Y.

[73] Assignee: Stanford Research Institute, Menlo Park, Calif.

[22] Filed: May 27, 1975

[21] Appl. No.: 580,894

Related U.S. Application Data

[63] Continuation-in-part of Ser. No. 323,523, Jan. 15, 1973, abandoned, which is a continuation-in-part of Ser. No. 82,539, Oct. 20, 1970, abandoned.

[30] Foreign Application Priority Data

Oct. 13, 1971  Italy .................................. 29833/71

[52] U.S. Cl. ............................ 106/296; 106/288 B; 106/300; 106/308 B; 106/304; 428/403; 427/216; 427/217

[51] Int. Cl.$^2$ ...................... C09C 1/00; C09C 1/04; C09C 1/36

[58] Field of Search ................ 106/308 B, 292, 300, 106/296, 288 B, 308 N, 304; 252/62.3, 301.4 R, 301.4; 428/403; 427/216, 217, 82; 148/33.3, 1.5; 204/196

[56] References Cited
UNITED STATES PATENTS

| | | | |
|---|---|---|---|
| 2,068,294 | 1/1937 | Korinth et al. ...................... | 106/296 |
| 2,296,636 | 9/1942 | Hanakan ............................. | 106/294 |
| 3,505,088 | 4/1970 | Luginsland et al. ............. | 106/308 B |
| 3,515,566 | 6/1970 | Moody et al. ................... | 106/308 B |

*Primary Examiner*—Winston A. Douglas
*Assistant Examiner*—J. V. Howard
*Attorney, Agent, or Firm*—Donovan J. De Witt

[57] ABSTRACT

A chemical species, present in two oxidation states which differ from one another by one equivalent, is added to pigment materials to serve as a recombination center for alternately capturing electrons and holes produced by the pigment materials when they are subjected to ultraviolet light exposure.

8 Claims, No Drawings

STABILIZED PIGMENT AND METHOD FOR PRODUCING THE SAME

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

RELATED APPLICATIONS

This application is a continuation-in-part of copending application Ser. No. 323,523, filed Jan. 15, 1973, which, in turn, is a continuation-in-part of copending application Ser. No. 82,539, filed Oct. 20, 1970, both now abandoned.

BACKGROUND OF THE INVENTION

This invention is in the field of preventing the discoloration of pigments. Discoloration of pigment utilized in paints or coatings, and particularly the discoloration of white pigment, has been recognized to be a severe problem. Optical discoloration has been found to be the most prevalent cause for the degradation of the pigments. Such optical discoloration normally occurs during exposure to ultraviolet radiation. A vacuum environment normally accelerates the discoloration and thus in applications where the pigment is to be exposed to a vacuum environment, such as in space applications and the like, the discoloration problem is more severe. However, changes in the properties of a paint, such as yellowing and chalking due to ultraviolet radiation are, of course, well known in air.

In addition to ultraviolet radiation, pigments have been known to degrade in the presence of X-rays and gamma rays. Normally, however, the degradation does not occur with visible or infrared light, although materials are found that color when exposed to such visible radiation. The discoloration effect is particularly noticeable with while pigments which are normally comprised of metal oxides, though other pigment materials are susceptible to a discoloration, as is well known.

In attempting to overcome the aforegoing problem of discoloration, the prior art technique has simply involved the testing of various pigment materials under ultraviolet radiation conditions to select the one or ones that are most stable against discoloration for use in environments where ultraviolet radiation is a problem. However, no white pigments particularly have been found which are not susceptible to discoloration upon exposure to ultraviolet radiation. Zinc oxide, for example, is a relatively stable pigment, yet it is subject to degradation. There has previously been developed a system of firing ZnO together with $SiO_2$ to provide improvement in the degradation of the ZnO. The reason for improved results is not clear. Some materials like $ZrO_2$ have been helped substantially by removing bulk impurities which accelerate the discoloration or degradation. The rate of discoloration of paints in air is very sensitive to the complete system used, some binders being very sensitive to irradiation. Thus, improvement can be obtained using inert binders.

Thus, an object of this invention is to provide a means for preventing the discoloration of pigments.

Another object of this invention is to provide a means for depositing small concentrations of impurities onto the surface of pigment material to prevent degradation of pigment particles or their binder upon exposure to ultraviolet radiation.

SUMMARY OF THE INVENTION

The above and other objects of this invention are accomplished by adding to a pigment a particular chemical species present in two stable oxidation states which differ from one another by one equivalent, said species being one wherein the pair of compounds making up the same is capable of alternately capturing electrons and holes so that there is no net chemical change of the pigment after such a capture cycle. It is believed that the effect of ultraviolet illumination upon various pigment materials such as zinc oxide, titanium oxide or the like is to produce electron-hole pairs in a semiconductor material. As a result, the energy of the light is transformed into the energy of the electron-hole. The electrons and/or holes can cause chemical changes if no preventive means are taken. The additive of the invention is deposited on the pigment particles and serves as a recombination center where the electron and hole generated by the breakdown of the pigment are recombined so that there is effectively no chemical change. The energy of the recombination is converted to heat. The additive species of this invention is added to the surface of the pigment in such amount that the respective components thereof embodying the different oxidation states are present in sufficient quantities as to serve as the recombination centers. It has been found, for example, that the degradation of zinc oxide, which is a common white pigment, can be prevented through the addition of the compound pair ferro (II) cyanide $Fe(CN)_6^{-4}$, and ferri (III) cyanide, $Fe(CN)_6^{-3}$, said cyanide species each being combined with another positive ion to form salts. With titanium dioxide pigments, the degradation can be controlled by the addition, for example, of the compound pair vanadium tetroxide and vanadium pentoxide, the pair cerous (III) perchlorate and ceric (IV) perchlorate or the pair potassium hexachloroiridate (III) and potassium hexachloroiridate (IV). Utilizing the concept of the invention, various additives can be chosen to serve as recombination sites, depending upon the particular pigments being utilized. Other methods of stabilizing pigments can be used in conjunction with the presently-described method, involving the use of appropriate recombination center additives, to further stabilize the coatings. Preferably, the latter method is employed in conjunction with one for coating the pigment particles in known fashion with an inert silica or alumina coating. Thus, an alumina coating can be provided by incorporating a soluble aluminum salt in an aqueous slurry of the pigment, along with the desired recombination additive pair, following which an alumina can be precipitated on the pigment particles by addition of a suitable alkaline material such as sodium carbonate, sodium hydroxide or ammonium hydroxide. When applying a silica coating, as by adding sodium silicate or other water-soluble silicates to the aqueous suspension, the coating is formed as the slurry is neutralized by addition of acid, thereby precipitating $SiO_2$. In both cases, the coating is affixed to the pigment particles, along with the additive pair, by filtering off the coated particles and drying the same.

DESCRIPTION OF THE PREFERRED EMBODIMENTS

The herein invention is based upon the theory that discoloration in pigments is due to the formation of holes and electrons when the pigments are subjected to radiation by ultraviolet light. For example, changes in the property of paint, such as yellowing and chalking due to ultraviolet exposure in air are well known. However, to date the coloration has not been associated with the formation of electrons and holes. Thus, in the case of a zinc oxide pigment it has been shown that holes and electrons produced from said oxide react irreversibly with foreign species on the surface of the zinc oxide material, causing oxidation and reduction. Such reactions could then cause changes in the absorption spectra of the system, since a different chemical species has a different absorption spectrum. Thus, chemical changes in the paint vehicle could be expected due to holes in electrons unless a vehicle is selected that is nonreactive. These chemical changes can then lead to a coloration of the species. In the case of zinc oxide or other pigments where there is no vehicle that is oxidizable or reducible on the surface of the pigment, it is believed that the holes and electrons generated can react with the host lattice itself. Such a reaction has been postulated and eventually leads to excess Zn. This in turn would serve to discolor the pigment since a different species results. Following are typical reactions assumed for holes and electrons in zinc oxide decomposition:

$$2p + O_L^- \rightarrow \tfrac{1}{2} O_2 \uparrow$$

$$2e + Zn_L^{++} \rightarrow Zn_i^+ + e$$

where:
$p$ = hole
$e$ = electron
$L$ = a lattice ion and
$i$ = interstitial impurity As can be seen above, zinc in the form of an interstitial impurity is formed. This location of the material in the crystal lattice can serve to provide discoloration even if there is no chemical reaction with a vehicle present in the paint. Further, however, where there is a vehicle that could be chemically reactive with the holes and electrons formed, a further degradation can occur. This can be illustrated by the oxidization of formic acid which has been demonstrated in accord with the following reactions. These reactions serve merely to indicate a typical type of reaction that can occur due to the presence of holes and electrons which would result initially from the illumination of the zinc oxide or other pigment by U.V. exposure.

$$P + HCOOH \rightarrow HCOO^- + H^+$$

$$2e + O_2 \rightarrow O_2^-$$

$$HCOO^- + O_2^- \rightarrow Complex$$

$$H^+ + p + complex \rightarrow CO_2 + H_2O_2$$

As can be seen from the demonstrated decomposition of zinc oxide, $O_2$ is evolved. Under ambient pressure conditions, degradation is not as severe as would be expected in a vacuum where the $O_2$ would be drawn out of the reaction. Thus, the proposed decomposition mechanism given would explain why in a vacuum environment the discoloration and degradation appears to be accelerated. At ambient atmospheric conditions the $O_2$ generated would tend to react more with the binder material containing the pigment to degrade or modify its properties. An example of this, of course, is shown with regard to the mechanism for the oxidization of the formic acid given above.

In view of the foregoing reaction, the present invention is thus applicable to any pigment material that upon irradiation forms holes and electrons. In addition to material such as zinc oxide which is known to be a relatively stable pigment, other materials such as $TiO_2$, $Zn_2TiO_4$, $Ta_2O_5$, AlP are also contemplated. The point is that the herein invention will teach one skilled in the art how to prevent the degradation in a material that will generate the holes and electrons, and thus the invention is not limited to any particular materials per se but rather those that will be found to produce the holes and electrons upon irradiation.

The herein invention is based upon the principle of providing a recombination site for the holes and electrons generated during the decomposition of pigment material. There are three characteristics that have been found to be required for the additives to be used in the invention in order to be efficient recombination centers. The first requirement is that the species should be one equivalent. That is, the pair of compounds comprising the stable oxidation states should differ from one another by one electronic charge. Secondly, the specie should be added to the surface with both oxidation states present in adequate quantities to serve as a recombination center. If only one form of the species is used, then either the electron capture, for example, would be very rapid and hole capture limited, or vice versa. Thirdly, the specie should have a reasonable capture cross-section for holes in its reduced form and for electrons in the oxidized form. The following general reactions indicate the effect of the recombination centers where $X^+$ and $X^{++}$ represent two stable oxidation states. One captures holes in accord with the reaction: $X^+ + p \rightarrow X^{++}$ and the other captures electrons:

$$X^{++} + e \rightarrow X^+$$

It should be appreciated from the above reactions that if the additive were to contain only $X^+$, there would be few states for electron capture. If electrons cannot be captured, recombination cannot occur. A few $X^+$ and $X^{++}$ will be produced through the reaction above but electrostatic considerations will preclude the build-up of many $X^{++}$ species. However, if a third reaction occurs permitting electrons to reach the surface, the electrostatic restriction will be lifted and $X^{++}$ can be formed. Then the condition would be reached which can be obtained much more directly by adding, as indicated, both the $X^+$ and $X^{++}$ species. Alternatively, if the species differ by more than one equivalent, that is, $X^+$ and $X^{+++}$, then both $X^+$ and $X^{++}$ must be able to capture holes, and both $X^{+++}$ and $X^{++}$ must be able to capture electrons. Although possible, these simultaneous properties are highly unlikely, and become more unlikely the more unstable the intermediate valence of the two-equivalent species is.

In addition to the additive of the invention being present in two stable oxidation states separated by one electron, the energy level occupied by this electron should preferably be just below the bottom of the conduction band of the pigment in order that both the hole and electron capture cross-sections be high. A typical capture cross-section is the area of the species, if little energy is released during the capture process. For example, with ferri- and ferrocyanide the area is approximately $10^{-15}$ cm$^2$. However, due to electrostatic attraction or repulsion, the capture cross-section can vary in known cases by a factor of $10^4$. Also, the energy accommodation during the capture process can be difficult, leading to very low capture cross-sections.

It should be pointed out that the chemical species additives being supplied are always competing with another less desirable capture process for the electrons and holes generated. Thus, it is particularly desirable to find a species with a relatively high cross-section so that the capture rate can be maximized and favored over the less desirable or undesirable reaction. In addition to the foregoing criteria, the additive should further be non-volatile and chemically inert toward environment and be uniformly distributed over the surface of each grain or other particle of pigment material.

The chemical species additives employed as a pair in a practice of this invention should be added to the pigment in amounts which are effective to provide the desired recombination center function and thus stabilize the pigment against change in color on exposure to ultraviolet light. In this connection, it has been found that good results can be obtained by employing said additives in an amount sufficient to provide the pigment particles with at least about 0.3 monolayer of the additives, with a preferred range being from about 0.3 to 1.0 monolayer of the additives. Coatings of this thickness are found to have little effect, per se, on the pigment color no matter what the color of the said additives. The term "coating", as employed herein, is used in a general sense to cover the several continuous and discontinuous layers of the additive compounds which may be applied to the surface of the pigment particles in a regular and generally uniform fashion.

In order to determine the amount of additive required to coat the particles of the pigment powder with a deposit of the desired thickness, one first calculates the total surface area of the pigment material utilized, based on the amount of the pigment and the size of the pigment particles. The size of the molecules of the additive used and the number of molecules will then determine the surface concentration of the additive. It has been calculated that a total of about $10^{15}$ molecules of the additive compounds per square centimeter of pigment area is sufficient to provide the pigment particles with a monolayer of said additive compounds.

It is particularly desirable in the herein invention to deposit the additive uniformly on the pigment material. Though various techniques can be used to achieve such a deposit, it has been found that a filtering technique is most preferred. For example, with zinc oxide powder an aqueous solution of ferri- and ferrocyanide is provided. The molarity of the solution is calculated assuming, for example, that 0.3 cc of solution per gm of ZnO will remain. Knowing the surface area of the zinc oxide to be added, one thus calculates back from the desired surface coverage to determine how much of the additive to put into the solution as indicated above. The mixture of the zinc oxide and the aqueous solution of the cyanides is then filtered with an aspirator. After filtering it has been found, for example, with this particular system that 0.3 cc water/gm ZnO remains and thus the above FIGURE of 0.3 cc solution/gm ZnO was used. This, of course, can vary depending upon the materials, size of powders, and the like. The filtered cake is then dried at a sufficient temperature to remove all the water therefrom. The resulting dried cake is then broken up and tested. It has been found that the cyanides remain on the zinc oxide when the water evaporates. There is some concentration of the additives at the surface of the cake but most remain distributed uniformly therethrough. Prior to utilization it is preferred that the dried powder coated with the additive of the invention is heated in air or oxygen at a temperature of 100° to 140°C for a period of time sufficient to dry the sample until it breaks up easily.

It would be impossible to list all potential additives that could be utilized in accord with the herein invention to serve as recombination centers. It is believed that in view of the foregoing criteria one skilled in the art, through relatively routine experimentation, can determine the additive or additives most suitable for a particular pigment material. Examples of ions that exist in stable one equivalent oxidation states could include $Mn_4^{6+}$ and $Mn_4^{7+}$, $Ag^+$ and $Ag$, $Fe^{2+}$ and $Fe^{3+}$, $Ce^{3+}$ and $Ce^{4+}$, $Ir^{3+}$ and $Ir^{4+}$, and $V^{4+}$ and $V^{5+}$. Naturally, as with the iron cyanides, the materials will be normally in the form of salts, such as potassium permanganate and the like.

It is believed that the invention will be further understood from the following examples:

EXAMPLE 1

Zinc oxide powder was utilized having an average particle size of $0.4 \times 10^{-4}$ cm. One gram of this zinc oxide was mixed into 5 cc of an aqueous solution of potassium ferricyanide and potassium ferrocyanide. The ratio of ferro to ferricyanide was 1:1. The molarity of the cyanide solution was calculated assuming that 0.3 cc of solution per gm ZnO would remain on the zinc oxide. The aforegoing molarity, 0.01 m, was based on the fact that the powder had an area circa 3m$^2$/g and it was desired to provide a 1/10 monolayer of molecules of the iron cyanide on the surface of the zinc oxide powder. The mixture was then put into a Buchner funnel and filtered with an aspirator. After this filtering, it was found that about 0.3 cc of water per gm ZnO remained as determined by weighing. The sample was then dried at 140°C and the resulting cake broken up and tested. The ferrocyanide remained on the zinc oxide when the water evaporated. The powder was then tested by measuring the reflectance as a function of wavelength in a vacuum chamber while intermittently exposing the ZnO to U.V. It was found that while significant absorption in the blue occurred after 350 sun hours of U.V. for samples with no additive (the sample turned yellow), the sample treated as above showed no change in reflectance spectrum.

EXAMPLE 2

In other tests conducted with zinc oxide powder, the procedures of Example 1 were followed to impregnate the powder with a 0.1 molecular monolayer of the following pairs of compounds, as present in equimolar amounts: potassium ferrocyanide (II) and potassium ferricyanide (III); potassium hexachloroiridate (III) and potassium hexachloroiridate (IV); and ceric (IV) perchlorate and cerous (III) perchlorate. A "blank" was also employed as a check. Quinoline was then applied to the several samples in the form of a solution containing one drop of quinoline in 15 ml CHCl$_3$, the purpose of adding the quinoline being to permit tests to detect photocatalyzed oxidation of an organic substance such as might be present in a binder. This test was carried out by passing a gaseous mixture of 0.4% oxygen in helium over the sample as the same was subjected to U.V. irradiation. The reaction was monitored by following the electron spin resonance (ESR) signal of the oxidized quinoline. It was found that by the use of the potassium iron cyanide compounds it was possible to slow the oxidation of quinoline to about 30% of the values obtained when no additive compounds were employed (the blank). However, the other additives employed in this test were relatively ineffective.

EXAMPLE 3

The method used in this example was one wherein a single, wafer-shaped crystal of rutile ($TiO_2$), previously etched in concentrated sulfuric acid, was sprayed with aqueous solutions of various pairs of additive compounds, the solution in each case also containing sufficient perchloric acid to provide a pH of about 1. The compound pairs employed, each in a 1:1 mole ratio to each other, were potassium ferro (II) cyanide and potassium ferri (III) cyanide; potassium hexachloroiridate (III) and potassium hexachloroiridate (IV); and cerous (III) perchlorate and ceric (IV) perchlorate, the last pair of salts having been formed under the influence of the added perchloric acid from the ceric sulfate and cerous nitrate used. A blank containing no added chemicals was also prepared. The solutions of the various stabilizing couples were applied to the rutile crystal at varying levels to provide samples containing 0.07 and 0.2 monomolecular layer of the treating compounds on the surface of the crystal. Each of the treated crystals was then mounted in a vacuum chamber, with appropriate electrical contacts being supplied to make a conductance measurement through the crystal. The pressure in the chamber was then reduced to $10^{-7}$ Torr, following which the crystal was subjected to illumination from a high-pressure mercury lamp for a period of about 20 minutes as conductance measurements were made to monitor photolysis and photodesorption from the crystal, it being found that equilibrium was reached well before the end of the illumination period. With no additive present (the blank), photoconductance was about $2 \times 10^{-7}$ mhos. While substantially this same reading was given in the samples prepared using the potassium iron cyanide compounds, it was found that the sample containing 0.2 monolayer of the iridium-containing compounds exhibited a light sensitivity (photo-induced conductance) which was lower than the blank by a factor of 20 ($10^{-8}$ mhos). The sample containing a 0.07 monolayer of the cerium-containing compounds also gave a reading of $10^{-8}$.

EXAMPLE 4

In this example $TiO_2$ paints were tested that had been prepared in a normal manner except that varying concentrations of vanadium ions were introduced to act as recombination centers. The ions when introduced were in the +4 and +5 oxidation state. The binder was a soya oil-modified alkyd resin. A blue dye was added to aid in the chalking test. The $TiO_2$ was prepared in an aqueous slurry containing 100 grams $TiO_2$, 160 cc 0.1N $HClO_4$, sufficient aluminum nitrate to provide 2.5 grams $Al_2O_3$, and varying amounts of $V_2O_4$ and $V_2O_5$. Samples were prepared with zero, $15\mu$ moles, $150\mu$ moles, and $1300\mu$ moles of vanadium. The alumina coating and the vanadium recombination centers were co-precipitated at 60°C by neutralizing the solution to pH 7.5. The pigments were then washed and dried, dispersed in the binder, and the paint applied to panels with a doctor blade. The paints were then exposed in a WeatherOmeter to test their resistance to chalking. The chalking tests used were measurements of gloss and red reflectance. With the blue dye present in the binder, the optical reflectance in the red part of the spectrum is low. However, as chalking occurs, exposing $TiO_2$ particles, the red light is reflected by the white $TiO_2$ particles. Thus $\Delta A$, the increase in red reflectance, is a sensitive measure of the chalking rate. After 1536 hours it was found that paints with no vanadium showed $\Delta A = 5.6$ units, and those with $15\mu$ moles, $150\mu$ moles, and $1300\mu$ moles showed $\Delta A = 4.0$, 2.9 and 1.6 units, respectively. Analogous improvement with vanadium was found in gloss measurements.

We claim:

1. An inorganic pigment which produces electrons and holes upon exposure to ultraviolet radiation and which is coated with a chemical species in two stable oxidation states which differ from each other by one equivalent, one of said states being capable of capturing said holes and the other of said states being capable of capturing said electrons, said chemical species being present in amounts effective to stabilize the pigment against change in color or exposure to ultraviolet light.

2. The coated pigment of claim 1 wherein said pigment is a solid particulate form and said chemical species coats the particles.

3. The coated pigment of claim 2 wherein the pigment is zinc oxide and the coating is a mixture of ferricyanide and ferrocyanide, each of which is combined with another positive ion to form the salts.

4. The coated pigment of claim 2 wherein the pigment is titanium oxide and the coating is a mixture of $Ce^{3+}$ and $Ce^{4+}$ salts.

5. The coated pigment of claim 2 wherein the pigment is titanium oxide and the coating is a mixture of $Ir^{3+}$ and $Ir^{4+}$ salts.

6. The coated pigment of claim 2 wherein the pigment is titanium dioxide and the coating is a mixture of $V^{+4}$ and $V^{+5}$ salts.

7. The coated pigment of claim 2 wherein the coating also contains silica.

8. The coated pigment of claim 2 wherein the coating also contains alumina.

* * * * *